July 20, 1954 P. G. SIEGEL ET AL Re. 23,853

INFANT'S GARMENT

Original Filed Nov. 28, 1952

INVENTORS.

Philip G. Siegel

BY Martin Stein

Howard E. Rarkoubach

ATTORNEY

Reissued July 20, 1954

Re. 23,853

UNITED STATES PATENT OFFICE 23,853

INFANT'S GARMENT

Philip G. Siegel, New York, and Martin Stein, Bronx, N. Y., assignors to Perfect Knit Togs, Inc., New York, N. Y., a corporation of New York Original No. 2,652,057, dated September 15, 1953, Serial No. 323,100, November 28, 1952. Application for reissue May 5, 1954, Serial No. 427,897

2 Claims. (Cl. 128—287)

Matter enclosed in heavy brackets [ ] appears in the original patent but forms no part of this reissue specification; matter printed in italics indicates the additions made by reissue.

The present invention relates to an infant's garment having means for holding a disposable diaper therein.

The general object of the present invention is to provide an infant's garment having a shirt portion and a moisture proof pants portion, and means for releasably securing in a quick, safe and easy manner a disposable diaper to said pants portion.

It is well known that infants lack sufficient control to make it necessary for reasons of health and comfort to change their diapers frequently during the course of the day. The features of speed, safety and ease of access are highly important attributes of a garment of this type in order to alleviate same of the time consuming and unpleasant aspects of caring for an infant or small child. It will be readily apparent to any parent that a garment embodying the invention herein, will greatly facilitate the burdensome task of keeping the child clean and dry. Thus, a particular object of the present invention is to provide an infant's garment which affords means for the quick, safe and easy method of changing disposable diapers.

In garments of the type known as training pants, i. e. cloth diapers, etc., it has been a customary practice to use safety pins in securing such diapers to a child's body. Since a child, while being diapered, most usually does not lie still, but may squirm or thrash about, this type of diapering operation is extremely dangerous in that, one of the two people involved may be jabbed with the pins. A further and very important object of the present invention is to provide an infant's garment which eliminates the use of diapering pins.

Another feature of the present invention is the provision of an infant's garment having a shirt and pants portion, said garment having means for partly or entirely separating the pants from the shirt portion. As has been mentioned previously, one of the most important aspects of diapering a child, is the speed with which this can be done, not only to minimize the troublesome task for the person doing it, but also to alleviate the uncomfortable feeling of the child. This can be accomplished by the simple method of partly removing the pants portion from the shirt, extracting a fouled diaper and inserting a clean and fresh one therein. The other features of having the garment made in both separable shirt and pants portions, are the different combinations of colors which can be obtained, and the advantage of not having to launder both portions at the same time.

It is also an object of the present invention to provide an infant's garment that is in its entirety easy to put on and take off, thus greatly simplifying the task of dressing and undressing the child.

Further objects of the present invention are to provide an infant's garment which is easy and inexpensive to manufacture, comfortable and well fitting, neat and attractive in appearance, which allows the maximum of bodily freedom, does not interfere with blood circulation, is waterproofed in the parts where required, will not chafe or irritate the tender skin of the child, and will withstand repeated launderings.

These and still further objects, features and advantages of the present invention will be more clearly understood from the following description, and from the drawing, in which one embodiment of the invention is shown by way of illustration.

Figure 1:
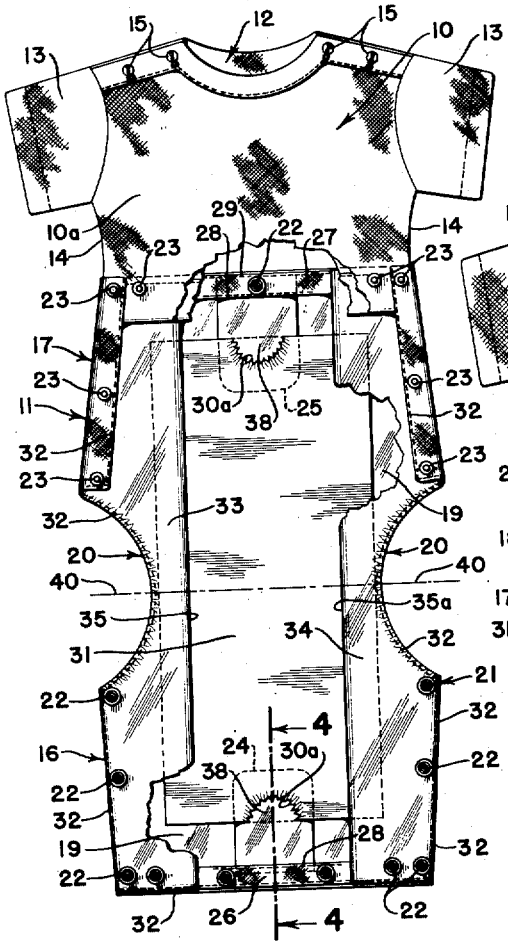
Fig. 1 is a front view of the garment with portions partly broken away. In this view the front of the pants portion has been opened and spread out to show the method by which a diaper is secured and held in place.
Figure 2:
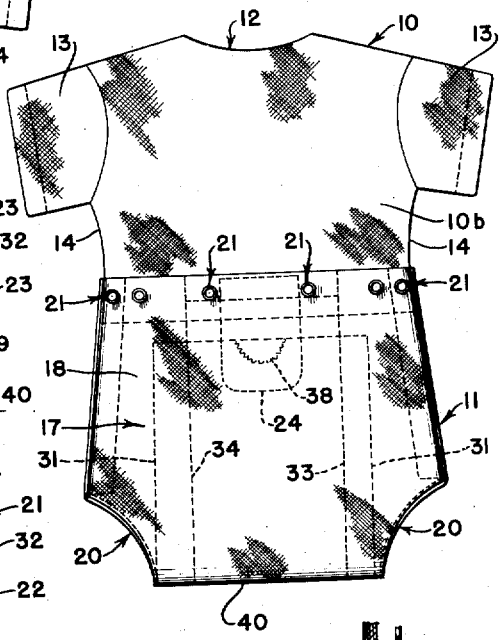
Fig. 2 is a rearview of the garment completely closed and in the manner in which it would be worn by a child.

The illustrated embodiment is an infant's garment, comprising a shirt portion designated 10 and a pants portion 11. Shirt portion 10 is provided with a neck opening 12 and sleeves 13, and consists of two sections, the front section 10a and back section 10b. Both sections 10a and 10b are secured to the sleeves 13 and are secured together along side seams 14. However, the two sections 10a and 10b are not permanently fastened together along the shoulder seams but are rather held in the closed positions by buttons 15. Thus, the whole top of the shirt portion 10 may be opened from one sleeve seam to the other, and this combined with the provisions for complete opening of the pants portion 11, permits the garment to be easily donned or removed.

The pants portion 11 of the garment is comprised of a front panel 16 and a rear panel 17. Pants portion 11 consists of a piece of fabric which when laid in a flat position is generally of an hour-glass form. This fabric may be any suitable material customarily used for this type of garment and consists of an outer surface 18 and an inner surface 19. Said inner surface 19 being made waterproof by applying to it any suitable material for this purpose, preferably a plastic. In the approximate center of pants portions 11, concave leg openings 20 are provided to permit said pants portion 11 to fit about the legs of the wearer.

Mounted about the periphery of pants portion 11 and the lower extremities of shirt portion 10, suitable snap fasteners 21 are provided for releasably securing pants portion 11 to shirt portion 10, along the waist line, and side edges of said pants portion 11. Of course, any other conventional type of fastener may be used, such as buttons. Female member 22 of the snap fasteners 21 are secured along the edges and top portions of front panel 16, and along the top portions of rear panel 17. Male members 23 of the snap fasteners 21 are secured to the bottom edges of shirt portion 10 and along the side edges of rear panel 17. The fasteners are applied in this manner so that a smooth juncture is formed when the panels have been secured to the shirt and to each other.

A pair of diaper securing members 24 and 25 which are essentially tabs made of a flexible material such as plastic, are centrally located along the latitudinal edges of front panel 16 and rear panel 17. Diaper securing members 24 and 25 are attached to reinforcing tapes 26 and 27 by stitching 28. Reinforcing tapes 26 and 27 in turn are attached to front panel 16 and rear panel 17 by suitable stitching 29 on the waterproof surface of pants portion 11, see particularly Fig. 1.

Substantially in the center of diaper securing members 24 and 25, a die-cut has been made resembling a crescent having serrated edges 30 and 30a. It will be understood that the serrated die cuts need not be crescent-shaped, as any desired general shape which will provide a flap may be used. Serrated edges 30 and 30a are provided for securing thereto a diaper 31. Said diaper 31 may or may not be of the disposable type, but must have highly absorbent and soft qualities. Some suitable materials being layers of tissue paper, cloth, and cotton gauze.

Secured by stitching 32 to the outside and along the lateral edges of panels 16 and 17, are a pair of flaps 33 and 34 which form a pair of oppositely disposed and cooperating longitudinal pockets 35 and 35a into which a dry, clean and fresh diaper is inserted after a previously fouled diaper has been removed.

Flaps 33 and 34 are made of a moisture proof flexible plastic material such as Vinylite. This combined with the provision of waterproofing the inner surface 19 of pants portion 11 permits the inside of pants portion 11 to be completely water repellant. A further feature of flaps 33 and 34 is to hold and retain diaper 31 in proper alinement within pockets 35 and 35a, thus preventing said diaper 31 from shifting about and always giving the garment "that dressed up look." Flaps 33 and 34 each consists of a single piece of flexible plastic material folded once upon itself and the free edges stitched to the periphery of pants portion 11. The inner edges of said flaps 33 and 34 being round will not cut, chafe or irritate the tender skin of a child.

Figure 3:
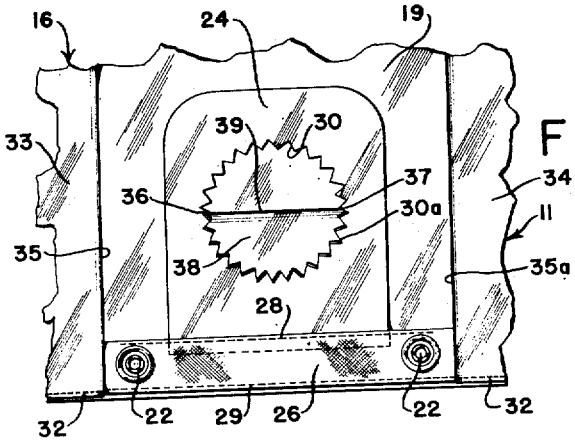
Fig. 3 is an enlarged front view of one of the diaper securing members and parts of the pants portion.

Referring now to Figs. 1 and 3, wherein diaper securing members 24 and 25 are best shown, it can be seen that between the ends 36 and 37 of the die-cut an arcuate flap 38 is provided having a pivotal edge 39. Flap 38 is provided with serrated edges 30a about its entire periphery which assist in securing diaper 31.

Figure 4:
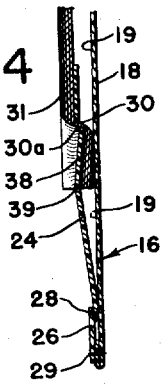
Fig. 4 is a section taken along line 4—4 of Fig. 1.

The method in which diaper securing members 24 and 25 releasably secure diaper 31 thereto is as follows. After removing a fouled diaper from pockets 35 and 35a and rotating the arcuate flap 38 to the position shown in Fig. 3, the approximate center of one of the shorter horizontal edges of a clean fresh diaper 31 is placed in a flat position against the pivotal edge 39 of flap 38. Flap 38 is then rotated to overlay diaper 31. By pressing flap 38 against diaper 31 and towards the inner surface 19 of pants portion 11, the serrated edges 30 and 30a will bite into that edge of diaper 31 and secure it in place. See Fig. 4. The same operation is then repeated at the opposite diaper securing member thus enabling both horizontal edges of diaper 31 to be secured. To release diaper 31 from diaper securing members 24 and 25, a person doing the diapering would simply place a finger of either hand underneath diaper securing members 24 and 25, allow the finger to come in contact with the pressed-in portion of diaper 31 and exert pressure in an upward direction against flap 38. This will permit serrated edges 30 and 30a to disengage the diaper 31, thus completely releasing it.

As shown clearest in Fig. 1, the front panel 16 and the rear panel 17 can be completely swung away from each other pivoting about the crotch line 40 of pants portion 11. It can thus be seen that ready and full access to the diaper 31 and diaper securing members 24 and 25 is provided.

A further advantage illustrated in the embodiment of Fig. 1 is, that the infant's diaper may be changed without completely unclothing it.

While the present invention, though shown to be adapted for use in a garment having both a shirt and pants portion 10 and 11 respectively, and the particular embodiment described is of that type, it is to be noted that this is not to be considered as a limitation on the scope of the invention. The invention is readily adaptable for use in a garment without the shirt portion 10. The pants portion 11 could be provided with suitable means, such as an elastic band to hold it to the waist of the wearer, thus eliminating the shirt portion 10 secured thereto, and the snap fasteners 21 provided for this purpose.

Although the embodiment shown does not include the feature of concealed fastening elements, it is readily apparent that this feature could be incorporated in the pants portion 11 of the garment. By folding under the edges of front panel 16 and securing the female fastening members 22 to the folded over portion, no part of the entire fastening elements 21 would be visible from the outside of the garment. The same could be done with the female fastening members 22 of rear panel 17. This has the advantage of providing a garment of neater appearance, the fastening elements 21 being completely concealed.

We claim:

1. An infant's garment comprising pants constituted of a fabric having longitudinal edges and being folded on a transverse line with portions of said longitudinal edges releasably attached to each other, means for releasably securing a diaper to said fabric comprising tabs of flexible material secured to opposite ends of said fabric, each of said tabs having a serrated die-cut therethrough to form a flap whereby an edge of said diaper may be clamped into each of said tabs by means of the flap associated therewith.

2. *An infant's garment comprising pants constituted of a fabric having longitudinal edges*

*and being folded on a transverse line with portions of said longitudinal edges releasably attached to each other, means for releasably securing a diaper to said fabric comprising a tab of flexible material secured to one end of said fabric, said tab having a serrated die-cut therethrough to form a flap whereby an edge of said diaper may be clamped into said tab by means of the flap associated therewith.*

References Cited in the file of this patent or the original patent.

UNITED STATES PATENTS

| Number | Name | Date |
|---|---|---|
| 1,297,474 | Jones | Mar. 18, 1919 |
| 1,765,105 | Skinner | June 17, 1930 |
| 2,518,631 | Mullen | Aug. 15, 1950 |
| 2,524,221 | Feeney | Oct. 3, 1950 |
| 2,545,674 | Ralph | Mar. 20, 1951 |
| 2,570,428 | Clifford | Oct. 9, 1951 |
| 2,574,279 | Oberle | Nov. 6, 1951 |
| 2,575,163 | Donovan | Nov. 13, 1951 |
| 2,606,558 | Kennette | Aug. 12, 1952 |